(12) United States Patent
Wang et al.

(10) Patent No.: US 10,559,106 B2
(45) Date of Patent: Feb. 11, 2020

(54) VIDEO SMOOTHING METHOD AND APPARATUS

(71) Applicant: Huawei Technologies Co., Ltd., Shenzhen (CN)

(72) Inventors: Kongqiao Wang, Shenzhen (CN); Jiangwei Li, Beijing (CN); Hao Wang, Shenzhen (CN); Xiuyan Guo, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 212 days.

(21) Appl. No.: 15/557,849

(22) PCT Filed: Nov. 16, 2015

(86) PCT No.: PCT/CN2015/094696
§ 371 (c)(1),
(2) Date: Sep. 13, 2017

(87) PCT Pub. No.: WO2017/084011
PCT Pub. Date: May 26, 2017

(65) Prior Publication Data
US 2018/0293770 A1    Oct. 11, 2018

(51) Int. Cl.
*G06T 11/60* (2006.01)
*G06T 13/80* (2011.01)
*H04N 5/232* (2006.01)

(52) U.S. Cl.
CPC .............. *G06T 11/60* (2013.01); *G06T 13/80* (2013.01); *H04N 5/23229* (2013.01); *G06T 2207/10016* (2013.01); *G06T 2207/30201* (2013.01)

(58) Field of Classification Search
CPC ...... H04N 19/176; H04N 19/86; H04N 19/82; H04N 19/154
(Continued)

(56) References Cited

U.S. PATENT DOCUMENTS 5,742,317 A * 4/1998 Kashihara ............... G06K 15/00
  347/131
7,382,932 B2 * 6/2008 Hattori ................. H04N 19/176
  375/E7.135
(Continued)

FOREIGN PATENT DOCUMENTS

CN  1819620 A   8/2006
CN  102281386 A  12/2011
(Continued)

OTHER PUBLICATIONS

Lu, J.-J. et al., "An Adaptive Weighted Mean Filter," Chinese Journal of Sensors and Actuators, vol. 18, No. 4, Dec. 2005, 6 pages.
(Continued)

*Primary Examiner* — Yosef Kassa
(74) *Attorney, Agent, or Firm* — Slater Matsil, LLP (57) ABSTRACT

A method includes obtaining a to-be-processed current point in a target area in a current frame, obtaining a first-type smoothing weight of a first-type neighborhood point in an $N^{th}$ frame before the current frame with respect to the current point, where the first-type neighborhood point is an $X^{th}$ circle point that encircles a point corresponding to a location of the current point and that is in the $N^{th}$ frame before the current frame, obtaining a second-type smoothing weight of a second-type neighborhood point in an $M^{th}$ frame after the current frame with respect to the current point, where the second-type neighborhood point is a $Y^{th}$ circle point that encircles the point corresponding to the location of the current point and that is in the $M^{th}$ frame after the current frame, and performing smoothing calculation on the current point according to the first-type smoothing weight and the second-type smoothing weight.

20 Claims, 4 Drawing Sheets

(58) Field of Classification Search
USPC ....... 382/260, 264, 274, 275, 282, 299, 300; 358/3.26, 3.27, 525, 537, 463
See application file for complete search history.

(56) References Cited

U.S. PATENT DOCUMENTS

| | | | | |
|---|---|---|---|---|
| 7,542,623 | B2* | 6/2009 | Hattori | H04N 19/176 382/232 |
| 7,769,089 | B1* | 8/2010 | Chou | H04N 5/144 375/240.26 |
| 7,995,649 | B2* | 8/2011 | Zuo | H04N 19/176 375/240.01 |
| 8,139,883 | B2* | 3/2012 | Zhang | G06T 5/002 348/607 |
| 8,199,812 | B2* | 6/2012 | Ye | H04N 19/105 375/240.02 |
| 8,315,351 | B2* | 11/2012 | Nakanishi | A61B 6/027 378/19 |
| 8,474,978 | B2* | 7/2013 | Huang | A61B 3/102 351/246 |
| 8,718,363 | B2* | 5/2014 | Desai | G06T 7/174 348/143 |
| 9,142,007 | B2* | 9/2015 | Yamamoto | G06T 5/002 |
| 2006/0182184 | A1 | 8/2006 | Maheo et al. | |
| 2006/0232710 | A1 | 10/2006 | Zhou et al. | |
| 2014/0071233 | A1 | 3/2014 | Lim et al. | |
| 2014/0307070 | A1 | 10/2014 | Woods | |
| 2014/0307979 | A1 | 10/2014 | Yamamoto | |

FOREIGN PATENT DOCUMENTS

| | | |
|---|---|---|
| CN | 103686192 A | 3/2014 |
| CN | 103903227 A | 7/2014 |
| CN | 104268847 A | 1/2015 |
| CN | 105046661 A | 11/2015 |

OTHER PUBLICATIONS

Zhongmin, Z. et al., "Improved polarimetric SAR speckle filter based on non-local means," Journal of Image and Graphics, Jun. 18, 2012, 9 pages.

Saeidi, M. et al., "Adaptive Weighted Averaging Filter Using the Appropriate Number of Consecutive Frames," World Academy of Science, Engineering and Technology International Journal of Electronics and Communication Engineering, vol. 4, No. 10, 2010, pp. 1482-1486.

Weinhaus, F., "ImageMagick v6 Examples—Convolution of Images," https://web.archive.org/web/20110721204002/http://www.imagemagick.org/Usage/convolve/, Dec. 6, 2018, pp. 1-35.

* cited by examiner

VIDEO SMOOTHING METHOD AND APPARATUS

CROSS-REFERENCE TO RELATED APPLICATIONS

This application is a national stage of International Application No. PCT/CN2015/094696, filed on Nov. 16, 2015, which is hereby incorporated by reference in its entirety.

TECHNICAL FIELD

Embodiments of the present invention relate to the field of image processing, and in particular, to a video smoothing method and apparatus.

BACKGROUND

Currently, with emergence and development of a mobile social network, using a mobile phone or another handheld terminal to take a selfie and perform facial beautification sweeps around the world. Divided according to user experience, selfie and facial beautification mainly have two types. One type is interactive facial beautification, that is, before facial beautification, a user needs to manually determine locations of facial organs, or correct the locations that are of the facial organs and that are automatically located by software, and facial beautification is performed based on the facial organs. Another type of facial beautification is one-tap facial beautification, that is, the user does not need to care about whether locating and division of the facial organs are accurate. After a photo is taken, a camera automatically divides and locates the locations of the facial organs according to a facial beautification algorithm, and automatically performs a facial beautification operation. This is full-automatic facial beautification. Considering a limitation of a screen size of the mobile phone and a requirement of most users for "shooting at any time and sharing at any time," the one-tap facial beautification is more popular on the market.

For the one-tap facial beautification, in addition to performing automatic facial beautification on a shot photo, most applications further perform real-time facial beautification on a viewfinder video in a preview state, so that the user can view a facial beautification effect before the photo is shot. Real-time video facial beautification mainly includes skin highlighting and dermabrasion (skin smoothing). In a facial beautification algorithm in the prior art, dermabrasion is independently performed on a video frame, that is, dermabrasion between frames is independent of each other. Consequently, smoothness of areas corresponding to adjacent frames may be inconsistent, and a texture or edge flare phenomenon occurs on a video after dermabrasion, resulting in relatively severe impact on user experience.

SUMMARY

Embodiments of the present invention provide a video smoothing method and apparatus, so as to avoid a texture or edge flare phenomenon of a video.

According to a first aspect, a video smoothing method is provided, including obtaining, from a video frame, a to-be-processed current point in a target area in a current frame. The method also includes obtaining a first-type smoothing weight of a first-type neighborhood point in an $N^{th}$ frame before the current frame with respect to the current point, where the first-type neighborhood point is an $X^{th}$ circle point that encircles a point corresponding to a location of the current point and that is in the $N^{th}$ frame before the current frame. Additionally, the method includes obtaining a second-type smoothing weight of a second-type neighborhood point in an $M^{th}$ frame after the current frame with respect to the current point, where the second-type neighborhood point is a $Y^{th}$ circle point that encircles the point corresponding to the location of the current point and that is in the $M^{th}$ frame after the current frame. The method also includes performing smoothing calculation on the current point according to the first-type smoothing weight and the second-type smoothing weight, where M, N, X, and Y are positive integers.

In the foregoing solution, when smoothing calculation is performed on a point in a current frame, a smoothing weight of a point in an $N^{th}$ frame before the current frame and a smoothing weight of a point in an $M^{th}$ frame after the current frame are referenced at the same time, that is, a time correlation of a video frame is considered during smoothing calculation; therefore, a texture or edge flare phenomenon of a video caused by considering only a point in a single frame during smoothing calculation can be avoided.

With reference to the first aspect, in a first possible implementation, the obtaining a first-type smoothing weight of a first-type neighborhood point in an $N^{th}$ frame before the current frame with respect to the current point includes: obtaining a third-type smoothing weight of a third-type neighborhood point of the current point in the current frame with respect to the current point, where the third-type neighborhood point is a $Z^{th}$ circle point that encircles the current point and that is in the current frame; obtaining a fourth-type smoothing weight of the point corresponding to the location of the current point in the $N^{th}$ frame before the current frame; and obtaining the first-type smoothing weight according to the fourth-type smoothing weight and the third-type smoothing weight.

With reference to the first aspect, in a second possible implementation, the obtaining a second-type smoothing weight of a second-type neighborhood point in an $M^{th}$ frame after the current frame with respect to the current point includes: obtaining a third-type smoothing weight of a third-type neighborhood point of the current point in the current frame with respect to the current point, where the third-type neighborhood point is a $Z^{th}$ circle point that encircles the current point and that is in the current frame; and obtaining a fifth-type smoothing weight of the point corresponding to the location of the current point in the $M^{th}$ frame after the current frame; and obtaining the second-type smoothing weight according to the fifth-type smoothing weight and the third-type smoothing weight.

With reference to the first aspect, in a third possible implementation, after the obtaining, from a video frame, a to-be-smoothed current point in a target area in a current frame, the method further includes: obtaining a third-type smoothing weight of a third-type neighborhood point of the current point in the current frame with respect to the current point, where the third-type neighborhood point is a $Z^{th}$ circle point that encircles the current point and that is in the current frame; and the performing smoothing calculation on the current point according to the first-type smoothing weight and the second-type smoothing weight is specifically: performing smoothing calculation on the current point according to the first-type smoothing weight, the second-type smoothing weight, and the third-type smoothing weight.

In the solution provided in the third possible implementation of the first aspect, when smoothing calculation is performed on the point in the current frame, the smoothing weight of the point in the $N^{th}$ frame before the current frame, the smoothing weight of the point in the $M^{th}$ frame after the current frame, and a smoothing weight of the point in the current frame are referenced at the same time, that is, during smoothing calculation, a spatial correlation of the current frame is considered at the same time of considering the time correlation of the video frame; therefore, the texture or edge flare phenomenon of the video caused by considering only the point in the single frame during smoothing calculation can be avoided.

With reference to any one of the first aspect or the foregoing possible implementations, in a fourth possible implementation, the performing smoothing calculation on the current point according to the first-type smoothing weight and the second-type smoothing weight includes: obtaining smoothing contributions of the first-type neighborhood point and the second-type neighborhood point to the current point according to a formula:

$$\sigma(k)*W(k)*W'(0)*[Y'(k)-Y'(0)], \sigma(k) = \begin{cases} 1, & \text{if } |Y'(k)-Y'(0)| < \text{MeanGrad\_TH'} \\ 0, & \text{if } |Y'(k)-Y'(0)| \geq \text{MeanGrad\_TH'} \end{cases};$$

and performing smoothing calculation on the current point according to the smoothing contributions of the first-type neighborhood point and the second-type neighborhood point to the current point, where:

$W(k)*W'(0)$ is the smoothing weight of the first-type neighborhood point in a $k^{th}$ circle, $W(k)$ is the smoothing weight of the third-type neighborhood point in the $k^{th}$ circle of the current point with respect to the current point, the third-type neighborhood point is the $Z^{th}$ circle point that encircles the current point and that is in the current frame, $W'(0)$ is a smoothing weight of the point corresponding to the location of the current point in the $N^{th}$ frame before the current frame, $Y'(k)$ is a gray value or a brightness value of the first-type neighborhood point in the $k^{th}$ circle, $Y'(0)$ is a gray value or a brightness value of the point corresponding to the location of the current point in the $N^{th}$ frame before the current frame, and MeanGrad_TH' is an average gradient value of a target area in the $N^{th}$ frame before the current frame; or $W(k)*W'(0)$ is the smoothing weight of the second-type neighborhood point in a $k^{th}$ circle, $W(k)$ is the smoothing weight of the third-type neighborhood point in the $k^{th}$ circle of the current point with respect to the current point, the third-type neighborhood point is the $Z^{th}$ circle point that encircles the current point and that is in the current frame, $W'(0)$ is a smoothing weight of the point corresponding to the location of the current point in the $M^{th}$ frame after the current frame, $Y'(k)$ is a gray value or a brightness value of the second-type neighborhood point in the $k^{th}$ circle, $Y'(0)$ is a gray value or a brightness value of the point corresponding to the location of the current point in the $M^{th}$ frame after the current frame, and MeanGrad_TH' is an average gradient value of a target area in the $M^{th}$ frame after the current frame.

With reference to the third possible implementation of the first aspect, in a fifth possible implementation, the performing smoothing calculation on the current point according to the first-type smoothing weight, the second-type smoothing weight, and the third-type smoothing weight includes: obtaining smoothing contributions of the first-type neighborhood point and the second-type neighborhood point to the current point according to a formula:

$$\sigma(k)*W(k)*W'(0)*[Y'(k)-Y'(0)],$$
$$\sigma(k) = \begin{cases} 1, & \text{if } |Y'(k)-Y'(0)| < \text{MeanGrad\_TH'} \\ 0, & \text{if } |Y'(k)-Y'(0)| \geq \text{MeanGrad\_TH'} \end{cases},$$

where $W(k)*W'(0)$ is the smoothing weight of the first-type neighborhood point in a $k^{th}$ circle, $W(k)$ is the smoothing weight of the third-type neighborhood point in the $k^{th}$ circle of the current point with respect to the current point, $W'(0)$ is a smoothing weight of the point corresponding to the location of the current point in the $N^{th}$ frame before the current frame, $Y'(k)$ is a gray value or a brightness value of the first-type neighborhood point in the $k^{th}$ circle, $Y'(0)$ is a gray value or a brightness value of the point corresponding to the location of the current point in the $N^{th}$ frame before the current frame, and MeanGrad_TH' is an average gradient value of a target area in the $N^{th}$ frame before the current frame; or $W(k)*W'(0)$ is the smoothing weight of the second-type neighborhood point in a $k^{th}$ circle, $W(k)$ is the smoothing weight of the third-type neighborhood point in the $k^{th}$ circle of the current point with respect to the current point, $W'(0)$ is a smoothing weight of the point corresponding to the location of the current point in the $M^{th}$ frame after the current frame, $Y'(k)$ is a gray value or a brightness value of the second-type neighborhood point in the $k^{th}$ circle, $Y'(0)$ is a gray value or a brightness value of the point corresponding to the location of the current point in the $M^{th}$ frame after the current frame, and MeanGrad_TH' is an average gradient value of a target area in the $M^{th}$ frame after the current frame; obtaining a smoothing contribution of the third-type neighborhood point to the current point according to a formula:

$$\sigma(k)*W(k)*[Y(k)-Y(0)],$$
$$\sigma(k) = \begin{cases} 1, & \text{if } |Y(k)-Y(0)| < \text{MeanGrad\_TH} \\ 0, & \text{if } |Y(k)-Y(0)| \geq \text{MeanGrad\_TH} \end{cases},$$

where $W(k)$ is the smoothing weight of the third-type neighborhood point in the $k^{th}$ circle, $Y(k)$ is a gray value or a brightness value of the third-type neighborhood point in the $k^{th}$ circle, $Y(0)$ is a gray value or a brightness value of the current point, and MeanGrad_TH is an average gradient value of the target area in the current frame; and performing smoothing calculation on the current point according to the smoothing contributions of the first-type neighborhood point, the second-type neighborhood point, and the third-type neighborhood point to the current point.

With reference to any one of the first aspect or the possible implementations of the first aspect, each smoothing weight is a reciprocal of an exponential power of 2. Because each smoothing weight is the reciprocal of the exponential power of 2, a multiplication and division operation in smoothing calculation may be converted into a shift operation, improving a smoothing calculation speed.

According to a second aspect, a video smoothing apparatus is provided, including an obtaining unit, configured to obtain, from a video frame, a to-be-processed current point in a target area in a current frame. The apparatus also includes a processing unit, configured to obtain a first-type smoothing weight of a first-type neighborhood point in an $N^{th}$ frame before the current frame with respect to the current point, where the first-type neighborhood point is an $X^{th}$ circle point that encircles a point corresponding to a location of the current point and that is in the $N^{th}$ frame before the current frame, where the processing unit is further configured to obtain a second-type smoothing weight of a second-type neighborhood point in an $M^{th}$ frame after the current frame with respect to the current point, where the second-type neighborhood point is a $Y^{th}$ circle point that encircles the point corresponding to the location of the current point and that is in the $M^{th}$ frame after the current frame. The processing unit is further configured to perform smoothing calculation on the current point according to the first-type smoothing weight and the second-type smoothing weight, where M, N, X, and Y are positive integers.

In the foregoing solution, when smoothing calculation is performed on a point in a current frame, a smoothing weight of a point in an $N^{th}$ frame before the current frame and a smoothing weight of a point in an $M^{th}$ frame after the current frame are referenced at the same time, that is, a time correlation of a video frame is considered during smoothing calculation; therefore, a texture or edge flare phenomenon of a video caused by considering only a point in a single frame during smoothing calculation can be avoided.

With reference to the second aspect, in a first possible implementation, the processing unit is specifically configured to: obtain a third-type smoothing weight of a third-type neighborhood point of the current point in the current frame with respect to the current point, where the third-type neighborhood point is a $Z^{th}$ circle point that encircles the current point and that is in the current frame; obtain a fourth-type smoothing weight of the point corresponding to the location of the current point in the $N^{th}$ frame before the current frame; and obtain the first-type smoothing weight according to the fourth-type smoothing weight and the third-type smoothing weight.

With reference to the second aspect, in a second possible implementation, the processing unit is specifically configured to: obtain a third-type smoothing weight of a third-type neighborhood point of the current point in the current frame with respect to the current point, where the third-type neighborhood point is a $Z^{th}$ circle point that encircles the current point and that is in the current frame; obtain a fifth-type smoothing weight of the point corresponding to the location of the current point in the $M^{th}$ frame after the current frame; and obtain the second-type smoothing weight according to the fifth-type smoothing weight and the third-type smoothing weight.

With reference to the second aspect, in a third possible implementation, the processing unit is further configured to obtain a third-type smoothing weight of a third-type neighborhood point of the current point in the current frame with respect to the current point, where the third-type neighborhood point is a $Z^{th}$ circle point that encircles the current point and that is in the current frame; and the processing unit is specifically configured to perform smoothing calculation on the current point according to the first-type smoothing weight, the second-type smoothing weight, and the third-type smoothing weight.

In the solution provided in the third possible implementation of the second aspect, when smoothing calculation is performed on the point in the current frame, the smoothing weight of the point in the $N^{th}$ frame before the current frame, the smoothing weight of the point in the $M^{th}$ frame after the current frame, and a smoothing weight of the point in the current frame are referenced at the same time, that is, during smoothing calculation, a spatial correlation of the current frame is considered at the same time of considering the time correlation of the video frame; therefore, the texture or edge flare phenomenon of the video caused by considering only the point in the single frame during smoothing calculation can be avoided.

With reference to any one of the second aspect or the foregoing possible implementations, in a fourth possible implementation, the processing unit is specifically configured to: obtain smoothing contributions of the first-type neighborhood point and the second-type neighborhood point to the current point according to a formula:

$$\sigma(k) * W(k) * W'(0) * [Y'(k) - Y'(0)],$$

$$\sigma(k) = \begin{cases} 1, & \text{if } |Y'(k) - Y'(0)| < \text{MeanGrad\_TH'} \\ 0, & \text{if } |Y'(k) - Y'(0)| \geq \text{MeanGrad\_TH'} \end{cases};$$

and perform smoothing calculation on the current point according to the smoothing contributions of the first-type neighborhood point and the second-type neighborhood point to the current point, where:

W(k)*W(0)

is the smoothing weight of the first-type neighborhood point in a $k^{th}$ circle, W(k) is the smoothing weight of the third-type neighborhood point in the $k^{th}$ circle of the current point with respect to the current point, the third-type neighborhood point is the $Z^{th}$ circle point that encircles the current point and that is in the current frame, W'(0) is a smoothing weight of the point corresponding to the location of the current point in the $N^{th}$ frame before the current frame, Y'(k) is a gray value or a brightness value of the first-type neighborhood point in the $k^{th}$ circle, Y'(0) is a gray value or a brightness value of the point corresponding to the location of the current point in the $N^{th}$ frame before the current frame, and MeanGrad_TH' is an average gradient value of a target area in the $N^{th}$ frame before the current frame; or W(k)*W'(0)

is the smoothing weight of the second-type neighborhood point in a $k^{th}$ circle, W(k) is the smoothing weight of the third-type neighborhood point in the $k^{th}$ circle of the current point with respect to the current point, the third-type neighborhood point is the $Z^{th}$ circle point that encircles the current point and that is in the current frame, W'(0) is a smoothing weight of the point corresponding to the location of the current point in the $M^{th}$ frame after the current frame, Y'(k) is a gray value or a brightness value of the second-type neighborhood point in the $k^{th}$ circle, Y'(0) is a gray value or a brightness value of the point corresponding to the location of the current point in the $M^{th}$ frame after the current frame, and MeanGrad_TH' is an average gradient value of a target area in the $M^{th}$ frame after the current frame.

With reference to the third possible implementation of the second aspect, in a fifth possible implementation, the processing unit is specifically configured to: obtain smoothing contributions of the first-type neighborhood point and the second-type neighborhood point to the current point according to a formula:

$$\sigma(k) * W(k) * W'(0) * [Y'(k) - Y'(0)],$$

$$\sigma(k) = \begin{cases} 1, & \text{if } |Y'(k) - Y'(0)| < \text{MeanGrad\_TH'} \\ 0, & \text{if } |Y'(k) - Y'(0)| \geq \text{MeanGrad\_TH'} \end{cases},$$

where

W(k)*W'(0)

is the smoothing weight of the first-type neighborhood point in a $k^{th}$ circle, W(k) is the smoothing weight of the third-type neighborhood point in the $k^{th}$ circle of the current point with respect to the current point, W(0) is a smoothing weight of the point corresponding to the location of the current point in the $N^{th}$ frame before the current frame, Y'(k) is a gray value or a brightness value of the first-type neighborhood point in the $k^{th}$ circle, Y'(0) is a gray value or a brightness value of the point corresponding to the location of the current point in the $N^{th}$ frame before the current frame, and MeanGrad_TH' is an average gradient value of a target area in the $N^{th}$ frame before the current frame; or W(k)*W'(0) is the smoothing weight of the second-type neighborhood point in a $k^{th}$ circle, W(k) is the smoothing weight of the third-type neighborhood point in the $k^{th}$ circle of the current point with respect to the current point, W'(0) is a smoothing weight of the point corresponding to the location of the current point in the $M^{th}$ frame after the current frame, Y'(k) is a gray value or a brightness value of the second-type neighborhood point in the $k^{th}$ circle, Y'(0) is a gray value or a brightness value of the point corresponding to the location of the current point in the $M^{th}$ frame after the current frame, and MeanGrad_TH is an average gradient value of a target area in the $M^{th}$ frame after the current frame; obtain a smoothing contribution of the third-type neighborhood point to the current point according to a formula:

$$\sigma(k) * W(k) * [Y(k) - Y(0)],$$

$$\sigma(k) = \begin{cases} 1, & \text{if } |Y(k) - Y(0)| < \text{MeanGrad\_TH} \\ 0, & \text{if } |Y(k) - Y(0)| \geq \text{MeanGrad\_TH} \end{cases},$$

where W(k) is the smoothing weight of the third-type neighborhood point in the $k^{th}$ circle, Y(k) is a gray value or a brightness value of the third-type neighborhood point in the $k^{th}$ circle, Y(0) is a gray value or a brightness value of the current point, and MeanGrad_TH is an average gradient value of the target area in the current frame; and perform smoothing calculation on the current point according to the smoothing contributions of the first-type neighborhood point, the second-type neighborhood point, and the third-type neighborhood point to the current point.

With reference to any one of the second aspect or the possible implementations of the second aspect, each smoothing weight is a reciprocal of an exponential power of 2. Because each smoothing weight is the reciprocal of the exponential power of 2, a multiplication and division operation in smoothing calculation may be converted into a shift operation, improving a smoothing calculation speed.

According to a third aspect, a video smoothing apparatus is provided, including a camera module, a processor, a memory, and a bus, where the camera module, the processor, and the memory are connected and complete mutual communication by using the bus, the camera module is configured to collect a video frame and store the video frame by using the memory, and the processor is configured to process program code in the memory; and the processor is configured to execute the method executed by the obtaining unit and the processing unit in the third aspect.

According to a fourth aspect, a computer readable medium is provided, including a computer readable instruction for performing the following operation when the instruction is being executed: performing operations in any implementation provided in the first aspect.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present embodiments.

Figure 1:
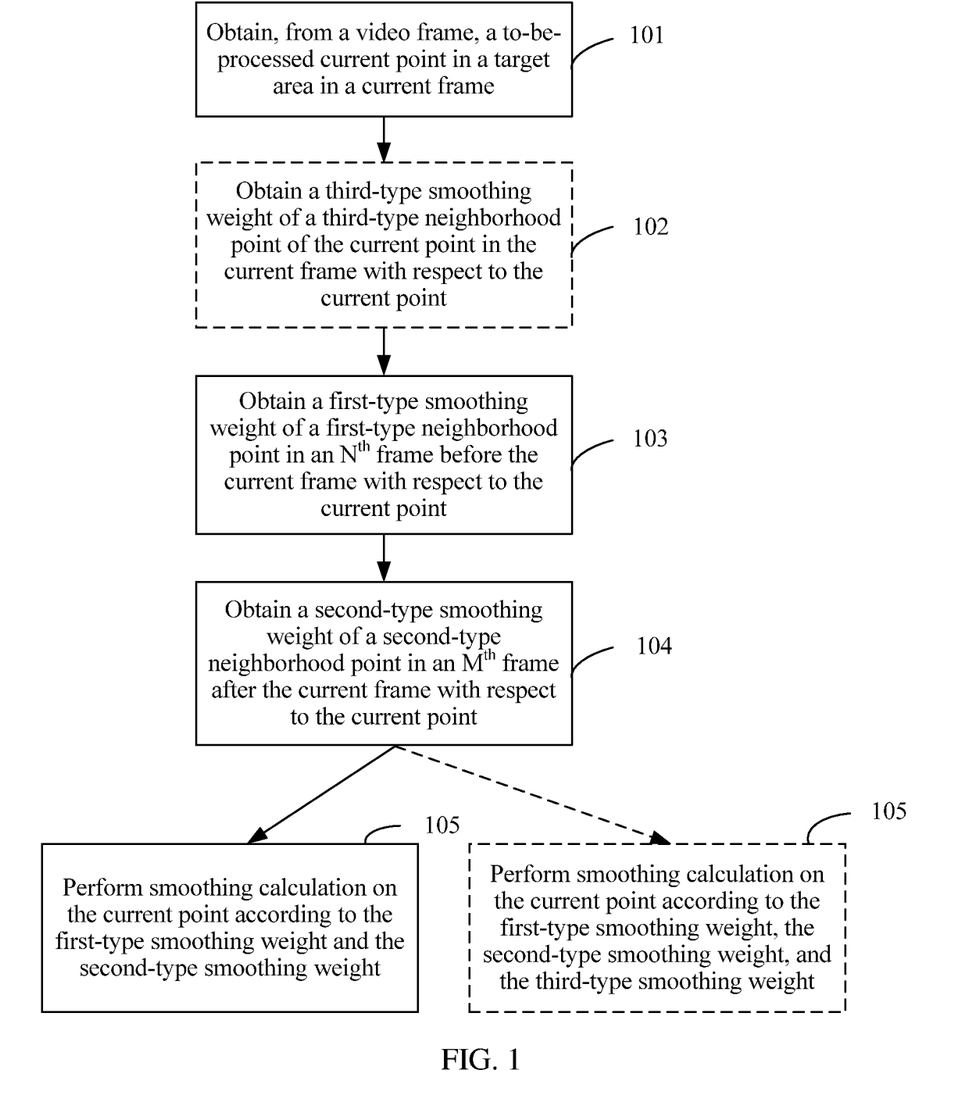
FIG. 1 is a schematic flowchart of a video smoothing method according to an embodiment of the present invention.

An embodiment of the present invention provides a video smoothing method, applied to a user terminal such as a mobile phone or a tablet computer. As shown in FIG. 1, the method includes the following steps.

101. Obtain, from a video frame, a to-be-processed current point in a target area in a current frame.

The user terminal generally performs video collection by using a camera module. A video is saved in a video frame manner. When the video is played, the video frame is played at a specific frequency (which is generally greater than 24 frames per second), and a viewer can view a consecutive video. In the foregoing step 101, the target area is an area in which smoothing calculation needs to be uniformly performed. The target area may be determined by using any method in the prior art. For example, the target area may be a skin area in a photo.

Optionally, the method further includes: 102. Obtain a third-type smoothing weight of a third-type neighborhood point of the current point in the current frame with respect to the current point.

The third-type neighborhood point is a $Z^{th}$ circle point that encircles the current point and that is in the current frame. That is, it may be understood that, during smoothing calculation on the current point, usually a smoothing weight of each neighborhood point in the current frame further needs to be referenced. Therefore, in an optional solution, step 102 further needs to be referenced.

103. Obtain a first-type smoothing weight of a first-type neighborhood point in an $N^{th}$ frame before the current frame with respect to the current point.

The first-type neighborhood point is an $X^{th}$ circle point that encircles a point corresponding to a location of the current point and that is in the $N^{th}$ frame before the current frame. Specifically, a method for obtaining the first-type smoothing weight in step 103 is: obtaining a third-type smoothing weight of a third-type neighborhood point of the current point in the current frame with respect to the current point, where the third-type neighborhood point is a $Z^{th}$ circle point that encircles the current point and that is in the current frame, Z is a positive integer, and when step 102 is included, the third-type smoothing weight herein may be the third-type smoothing weight obtained in step 102; obtaining a fourth-type smoothing weight of the point corresponding to the location of the current point in the $N^{th}$ frame before the current frame; and obtaining the first-type smoothing weight according to the fourth-type smoothing weight and the third-type smoothing weight.

104. Obtain a second-type smoothing weight of a second-type neighborhood point in an $M^{th}$ frame after the current frame with respect to the current point.

The second-type neighborhood point is a $Y^{th}$ circle point that encircles the point corresponding to the location of the current point and that is in the $M^{th}$ frame after the current frame. Specifically, a method for obtaining the first-type smoothing weight in step 104 is: obtaining a third-type smoothing weight of a third-type neighborhood point of the current point in the current frame with respect to the current point, where the third-type neighborhood point is a $Z^{th}$ circle point that encircles the current point and that is in the current frame, Z is a positive integer, and when step 102 is included, the third-type smoothing weight herein may be the third-type smoothing weight obtained in step 102; obtaining a fifth-type smoothing weight of the point corresponding to the location of the current point in the $M^{th}$ frame after the current frame; and obtaining the second-type smoothing weight according to the fifth-type smoothing weight and the third-type smoothing weight.

105. Perform smoothing calculation on the current point according to the first-type smoothing weight and the second-type smoothing weight.

Specifically, when step 102 is included, step 105 is specifically performing smoothing calculation on the current point according to the first-type smoothing weight, the second-type smoothing weight, and the third-type smoothing weight. In the foregoing solution, M, N, X, and Y are positive integers.

In the foregoing solution, steps 102, 103, and 104 are not a limitation on a sequence of the steps. That is, after the current point is determined in step 101, steps 102, 103, and 104 may be performed at the same time or may be performed in any other sequence.

In the foregoing solution, when smoothing calculation is performed on a point in a current frame, a smoothing weight of a point in an $N^{th}$ frame before the current frame and a smoothing weight of a point in an $M^{th}$ frame after the current frame are referenced at the same time, that is, a time correlation of a video frame is considered during smoothing calculation; therefore, a texture or edge flare phenomenon of a video caused by considering only a point in a single frame during smoothing calculation can be avoided. Further, when step 102 is included, in the foregoing solution, when smoothing calculation is performed on the point in the current frame, the smoothing weight of the point in the $N^{th}$ frame before the current frame, the smoothing weight of the point in the $M^{th}$ frame after the current frame, and a smoothing weight of the point in the current frame are referenced at the same time, that is, during smoothing calculation, a spatial correlation of the current frame is considered at the same time of considering the time correlation of the video frame; therefore, the texture or edge flare phenomenon of the video caused by considering only the point in the single frame during smoothing calculation can be avoided.

Figure 2:
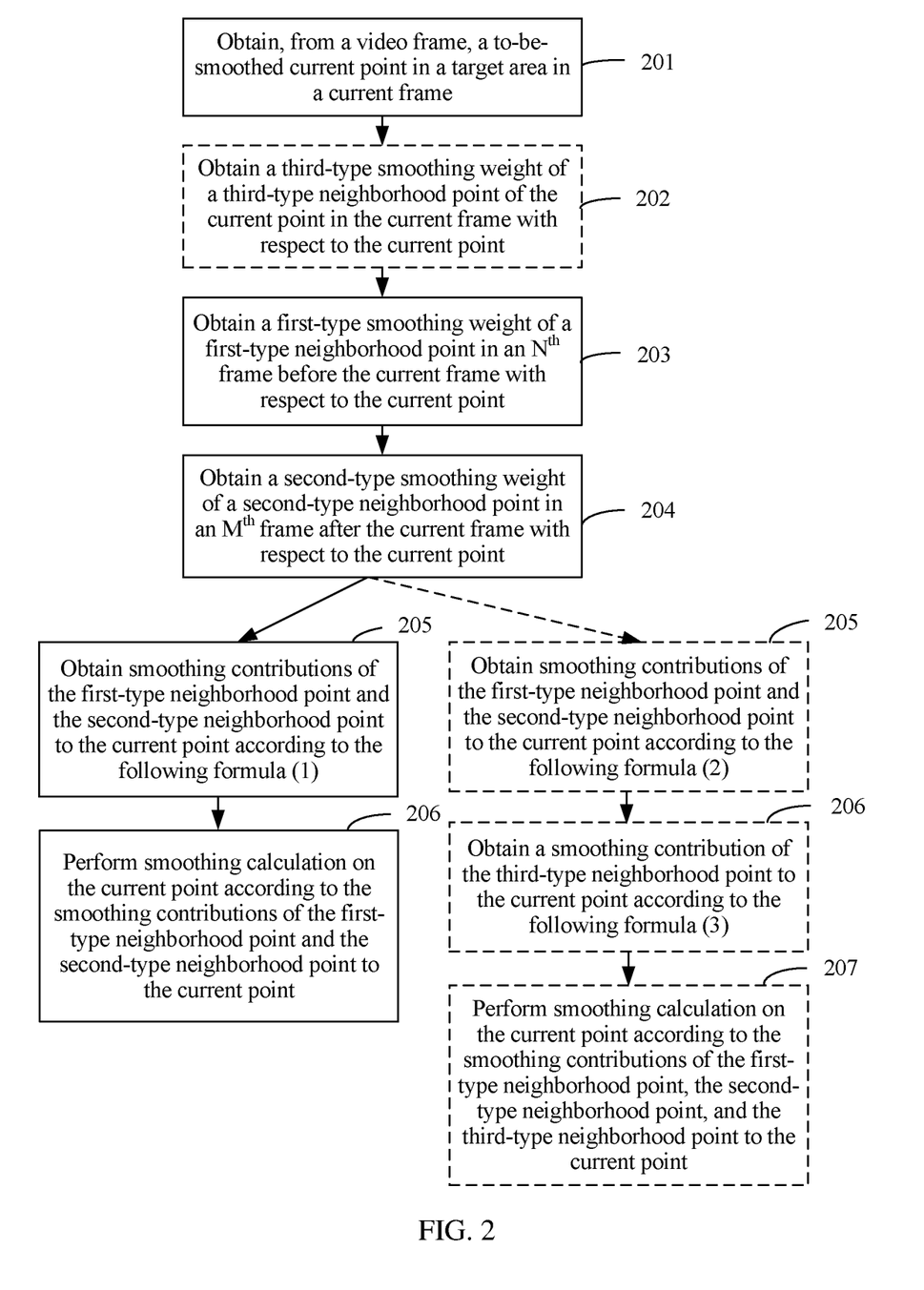
FIG. 2 is a schematic flowchart of a video smoothing method according to another embodiment of the present invention.

As shown in FIG. 2, an embodiment of the present invention provides another video smoothing method, including the following steps.

201. Obtain, from a video frame, a to-be-smoothed current point in a target area in a current frame.

Optionally, the method further includes: 202. Obtain a third-type smoothing weight of a third-type neighborhood point of the current point in the current frame with respect to the current point.

The third-type neighborhood point is a $Z^{th}$ circle point that encircles the current point and that is in the current frame. That is, it may be understood that, during smoothing calculation on the current point, usually a smoothing weight of each neighborhood point in the current frame further needs to be referenced. Therefore, in an optional solution, step 202 further needs to be referenced.

203. Obtain a first-type smoothing weight of a first-type neighborhood point in an $N^{th}$ frame before the current frame with respect to the current point.

The first-type neighborhood point is an $X^{th}$ circle point that encircles a point corresponding to a location of the current point and that is in the $N^{th}$ frame before the current frame.

204. Obtain a second-type smoothing weight of a second-type neighborhood point in an $M^{th}$ frame after the current frame with respect to the current point.

The second-type neighborhood point is a $Y^{th}$ circle point that encircles the point corresponding to the location of the current point and that is in the $M^{th}$ frame after the current frame.

205. Obtain smoothing contributions of the first-type neighborhood point and the second-type neighborhood point to the current point according to the following formula (1).

$$\sigma(k) * W(k) * W'(0) * [Y'(k) - Y'(0)], \qquad \text{Formula (1)}$$

$$\sigma(k) = \begin{cases} 1, & \text{if } |Y'(k) - Y'(0)| < \text{MeanGrad\_TH} \\ 0, & \text{if } |Y'(k) - Y'(0)| \geq \text{MeanGrad\_TH} \end{cases}$$

206. Perform smoothing calculation on the current point according to the smoothing contributions of the first-type neighborhood point and the second-type neighborhood point to the current point.

W(k)*W'(0) is the smoothing weight of the first-type neighborhood point in a $k^{th}$ circle, W(k) is the smoothing weight of the third-type neighborhood point in the $k^{th}$ circle of the current point with respect to the current point, the third-type neighborhood point is the $Z^{th}$ circle point that encircles the current point and that is in the current frame, W'(0) is a smoothing weight of the point corresponding to the location of the current point in the $N^{th}$ frame before the current frame, Y'(k) is a gray value or a brightness value of the first-type neighborhood point in the $k^{th}$ circle, Y'(0) is a gray value or a brightness value of the point corresponding to the location of the current point in the $N^{th}$ frame before the current frame, and MeanGrad_TH' is an average gradient value of a target area in the $N^{th}$ frame before the current frame; or W(k)*W'(0) is the smoothing weight of the second-type neighborhood point in a $k^{th}$ circle, W(k) is the smoothing weight of the third-type neighborhood point in the $k^{th}$ circle of the current point with respect to the current point, the third-type neighborhood point is the $Z^{th}$ circle point that encircles the current point and that is in the current frame, W'(0) is a smoothing weight of the point corresponding to the location of the current point in the $M^{th}$ frame after the current frame, Y'(k) is a gray value or a brightness value of the second-type neighborhood point in the $k^{th}$ circle, Y'(0) is a gray value or a brightness value of the point corresponding to the location of the current point in the $M^{th}$ frame after the current frame, and MeanGrad_TH is an average gradient value of a target area in the $M^{th}$ frame after the current frame. The average gradient value of the target area in the video frame is definition of an image in the target area, reflects a detail contrast expression capability of the image, and is generally represented by a gray variance rate of a pixel.

In the foregoing solution, when smoothing calculation is performed on a point in a current frame, a smoothing weight of a point in an $N^{th}$ frame before the current frame and a smoothing weight of a point in an $M^{th}$ frame after the current frame are referenced at the same time, that is, a time correlation of a video frame is considered during smoothing calculation; therefore, a texture or edge flare phenomenon of a video caused by considering only a point in a single frame during smoothing calculation can be avoided.

When step 202 is included, after step 204, the method specifically includes the following steps.

205. Obtain smoothing contributions of the first-type neighborhood point and the second-type neighborhood point to the current point according to the following formula (2).

$$\sigma(k) * W(k) * W'(0) * [Y'(k) - Y'(0)], \quad \text{Formula (2)}$$

$$\sigma(k) = \begin{cases} 1, & \text{if } |Y'(k) - Y'(0)| < \text{MeanGrad\_TH'} \\ 0, & \text{if } |Y'(k) - Y'(0)| \geq \text{MeanGrad\_TH'} \end{cases}$$

W(k)*W'(0) is the smoothing weight of the first-type neighborhood point in a $k^{th}$ circle, W(k) is the smoothing weight of the third-type neighborhood point in the $k^{th}$ circle of the current point with respect to the current point, the third-type neighborhood point is the $Z^{th}$ circle point that encircles the current point and that is in the current frame, W'(0) is a smoothing weight of the point corresponding to the location of the current point in the $N^{th}$ frame before the current frame, Y'(k) is a gray value or a brightness value of the first-type neighborhood point in the $k^{th}$ circle, Y'(0) is a gray value or a brightness value of the point corresponding to the location of the current point in the $N^{th}$ frame before the current frame, and MeanGrad_TH is an average gradient value of a target area in the $N^{th}$ frame before the current frame; or W(k)*W'(0) is the smoothing weight of the second-type neighborhood point in a $k^{th}$ circle, W(k) is the smoothing weight of the third-type neighborhood point in the $k^{th}$ circle of the current point with respect to the current point, the third-type neighborhood point is the $Z^{th}$ circle point that encircles the current point and that is in the current frame, W'(0) is a smoothing weight of the point corresponding to the location of the current point in the $M^{th}$ frame after the current frame, Y'(k) is a gray value or a brightness value of the second-type neighborhood point in the $k^{th}$ circle, Y'(0) is a gray value or a brightness value of the point corresponding to the location of the current point in the $M^{th}$ frame after the current frame, and MeanGrad_TH' is an average gradient value of a target area in the $M^{th}$ frame after the current frame.

206. Obtain a smoothing contribution of the third-type neighborhood point to the current point according to the following formula (3).

$$\sigma(k) * W(k) * [Y(k) - Y(0)], \quad \text{Formula (3)}$$

$$\sigma(k) = \begin{cases} 1, & \text{if } |Y(k) - Y(0)| < \text{MeanGrad\_TH} \\ 0, & \text{if } |Y(k) - Y(0)| \geq \text{MeanGrad\_TH} \end{cases}$$

W(k) is the smoothing weight of the third-type neighborhood point in the $k^{th}$ circle, Y(k) is a gray value or a brightness value of the third-type neighborhood point in the $k^{th}$ circle, Y(0) is a gray value or a brightness value of the current point, and MeanGrad_TH is an average gradient value of the target area in the current frame.

207. Perform smoothing calculation on the current point according to the smoothing contributions of the first-type neighborhood point, the second-type neighborhood point, and the third-type neighborhood point to the current point.

In the foregoing solution, when smoothing calculation is performed on the point in the current frame, the smoothing weight of the point in the $N^{th}$ frame before the current frame, the smoothing weight of the point in the $M^{th}$ frame after the current frame, and a smoothing weight of the point in the current frame are referenced at the same time, that is, during smoothing calculation, a spatial correlation of the current frame is considered at the same time of considering the time correlation of the video frame; therefore, the texture or edge flare phenomenon of the video caused by considering only the point in the single frame during smoothing calculation can be avoided.

Figure 3:
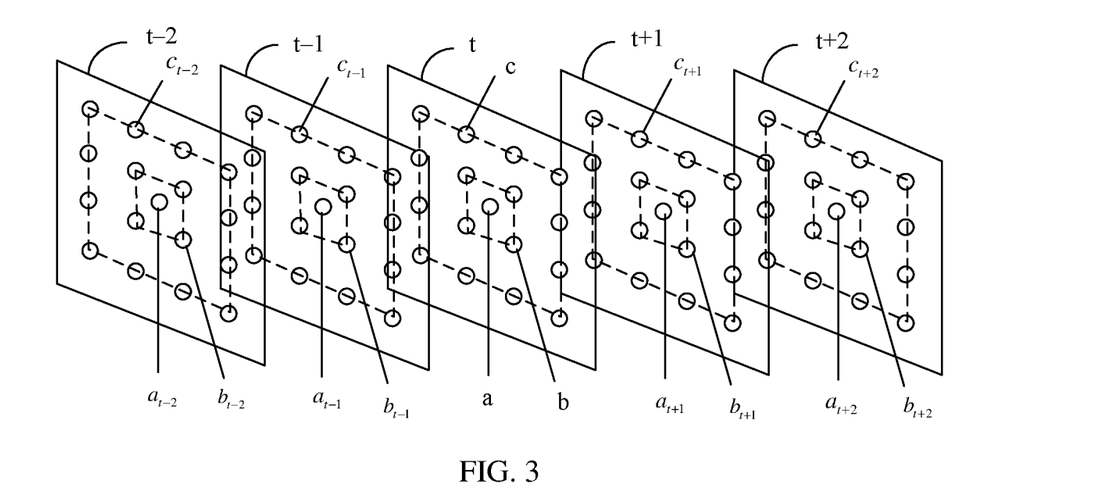
FIG. 3 is a schematic diagram of a frame structure in a video smoothing method according to still another embodiment of the present invention.

For example, as shown in FIG. 3, a current frame t, a previous frame t−1 of the current frame, a second previous frame t−2 of the current frame, a next frame t+1 of the current frame t, and a second next frame t+2 of the current frame t are provided. Each frame includes a target area T. When smoothing calculation is performed on a current point a in a target area in the current frame t, in terms of space, that is, in the current frame t, smoothing calculation on the current point a is determined by a neighborhood point around the current point a, and a neighborhood point that is closer to the current point a contributes more to smoothing calculation on the current point a. A first-circle neighborhood point b and a second-circle neighborhood point c of the current point a are shown in FIG. 3. For example, if a smoothing weight allocated to a neighborhood point is W(k), in a same frame, a smoothing contribution of the neighborhood point to the current point is:

$$\sigma(k) * W(k) * [Y(k) - Y(0)], \quad \text{Formula (4)}$$

$$\sigma(k) = \begin{cases} 1, & \text{if } |Y(k) - Y(0)| < \text{MeanGrad\_TH} \\ 0, & \text{if } |Y(k) - Y(0)| \geq \text{MeanGrad\_TH} \end{cases}$$

It is described in the foregoing embodiment that Y(k) is a gray value or a brightness value of a third-type neighborhood point in a $k^{th}$ circle, and Y(0) is a gray value or a brightness value of the current point. The formula (4) indicates that if a gradient between a neighborhood point and the current point is relatively large, the neighborhood point does not participate in smoothing. The smoothing policy may effectively protect a characteristic of a complexion area. For example, for a facial area, a facial characteristic such as eyes or eyebrows may be effectively protected from being smoothed in the smoothing method. It may be understood that the average gradient value of the target area is updated when the current frame is updated.

In terms of time, smoothing calculation is performed on the current point by referencing neighborhood points in several frames before the current frame at the same time. For example, if a smoothing weight allocated to a neighborhood point of a neighboring frame is W'(k), in the neighboring frame, a smoothing contribution of the neighborhood point to the current point is:

$$\sigma(k) * W(k) * W'(0) * [Y'(k) - Y'(0)], \quad \text{formula (5)}$$

$$\sigma(k) = \begin{cases} 1, & \text{if } |Y'(k) - Y'(0)| < \text{MeanGrad\_TH} \\ 0, & \text{if } |Y'(k) - Y'(0)| \geq \text{MeanGrad\_TH} \end{cases}.$$

A difference between the formula (5) and the formula (4) indicates that a weight of a point corresponding to the current point in the neighboring frame needs to be considered for the smoothing contribution of the neighborhood point in the neighboring frame to the current point. For example, a weight coefficient:

$$W_t(1) = \frac{1}{8}$$

is allocated to the first-circle neighborhood point b of the current point a in the current frame in FIG. 3, and a weight coefficient:

$$W_t(2) = \frac{1}{16}$$

is allocated to the second-circle neighborhood point c. A weight is allocated to a neighborhood point of a point corresponding to a location of the current point a in the neighboring frame by using a same method. A weight of a point corresponding to the location of the current point in the neighboring frame needs to be considered for the smoothing contribution of the neighborhood point in the neighboring frame to the current point. Therefore, if a weight allocated to a point $a_{t-1}$ corresponding to the location of the current point a in a $(t-1)^{th}$ frame is:

$$W_{t-1}(0) = \frac{1}{2},$$

a weight allocated to a point $a_{t-2}$ corresponding to the location of the current point a in a $(t-2)^{th}$ frame is:

$$W_{t-2}(0) = \frac{1}{4},$$

a weight allocated to a point $a_{t+1}$ corresponding to the location of the current point a in a $(t+1)^{th}$ frame is:

$$W_{t+1}(0) = \frac{1}{2},$$

and a weight allocated to a point $a_{t+2}$ corresponding to the location of the current point a in a $(t+2)^{th}$ frame is:

$$W_{t+2}(0) = \frac{1}{4},$$

a weight allocated to a first-circle neighborhood point $b_{t-1}$ of the point $a_{t-1}$ in the $(t-1)^{th}$ frame is:

$$W_{t-1}(0)W_t(1) = \frac{1}{16},$$

and a weight allocated to a second-circle neighborhood point $c_{t-1}$ of the point $a_{t-1}$ in the $(t-1)^{th}$ frame is:

$$W_{t-1}(0)W_t(2) = \frac{1}{32};$$

a weight allocated to a first-circle neighborhood point $b_{t+1}$ of the point $a_{t+1}$ in the $(t+1)^{th}$ frame is:

$$W_{t+1}(0)W_t(1) = \frac{1}{16},$$

and a weight allocated to a second-circle neighborhood point $c_{t+1}$ of the point $a_{t+1}$ in the $(t+1)^{th}$ frame is:

$$W_{t+1}(0)W_t(2) = \frac{1}{32};$$

a weight allocated to a first-circle neighborhood point $b_{t-2}$ of the point $a_{t-2}$ in the $(t-2)^{th}$ frame is:

$$W_{t-2}(0)W_t(1) = \frac{1}{32},$$

and a weight allocated to a second-circle neighborhood point $c_{t-2}$ of the point $a_{t-2}$ in the $(t-2)^{th}$ frame is:

$$W_{t-2}(0)W_t(2) = \frac{1}{64};$$

and a weight allocated to a first-circle neighborhood point $b_{t+2}$ of the point $a_{t+2}$ in the $(t+2)^{th}$ frame is:

$$W_{t+2}(0)W_t(1) = \frac{1}{32},$$

and a weight allocated to a second-circle neighborhood point $c_{t+2}$ of the point $a_{t+2}$ in the $(t+2)^{th}$ frame is:

$$W_{t+2}(0)W_t(2) = \frac{1}{64}.$$

In the foregoing embodiment, each smoothing weight is a reciprocal of an exponential power of 2. Therefore, a multiplication and division operation in smoothing calculation is converted into a shift operation, improving smoothing calculation efficiency.

In addition, smoothing calculation used in steps 105 and 207 may use a smoothing median filtering manner provided in this embodiment of the present invention. For example, the following formula may be used:

$$y(0) = Y(0) + \frac{\sum_{k=1}^{N} \sigma(k) * W(k) * [Y(k) - Y(0)]}{\sum_{k=1}^{N} \sigma(k) * W(k)}, \quad \text{Formula (6)}$$

$$\sigma(k) = \begin{cases} 1, & \text{if } |Y(k) - Y(0)| < \text{MeanGrad\_TH} \\ 0, & \text{if } |Y'(k) - Y'(0)| \geq \text{MeanGrad\_TH} \end{cases}$$

In the formula (6), a gray value or a brightness value of a point (that is, the neighborhood point of the current point) that participates in smoothing is Y (k), a gray value or a brightness value of the current point is Y (o), a gray value or a brightness value of a smoothed current point is y (o), and W (k) is a smoothing weight of the point that participates in smoothing with respect to the current point. The foregoing smoothing calculation manner is merely an example, and certainly, it may be considered that another smoothing calculation manner in the prior art may be applied to this application.

Figure 4:
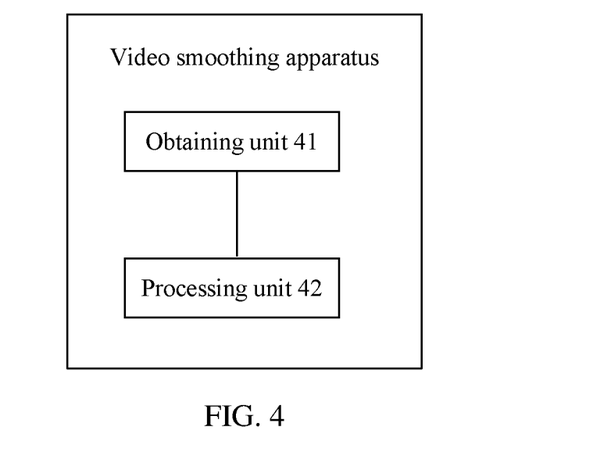
FIG. 4 is a schematic structural diagram of a video smoothing apparatus according to an embodiment of the present invention.

As shown in FIG. 4, an embodiment of the present invention provides a video smoothing apparatus, configured to implement the video smoothing method provided in the foregoing embodiment. The apparatus includes: an obtaining unit 41, configured to obtain, from a video frame, a to-be-processed current point in a target area in a current frame; and a processing unit 42, configured to obtain a first-type smoothing weight of a first-type neighborhood point in an $N^{th}$ frame before the current frame with respect to the current point, where the first-type neighborhood point is an $X^{th}$ circle point that encircles a point corresponding to a location of the current point and that is in the $N^{th}$ frame before the current frame, where the processing unit 42 is further configured to obtain a second-type smoothing weight of a second-type neighborhood point in an $M^{th}$ frame after the current frame with respect to the current point, where the second-type neighborhood point is a $Y^{th}$ circle point that encircles the point corresponding to the location of the current point and that is in the $M^{th}$ frame after the current frame; and the processing unit 42 is further configured to perform smoothing calculation on the current point according to the first-type smoothing weight and the second-type smoothing weight, where M, N, X, and Y are positive integers.

In the foregoing solution, when smoothing calculation is performed on a point in a current frame, a smoothing weight of a point in an $N^{th}$ frame before the current frame and a smoothing weight of a point in an $M^{th}$ frame after the current frame are referenced at the same time, that is, a time correlation of a video frame is considered during smoothing calculation; therefore, a texture or edge flare phenomenon of a video caused by considering only a point in a single frame during smoothing calculation can be avoided.

Optionally, the processing unit 42 is specifically configured to: obtain a third-type smoothing weight of a third-type neighborhood point of the current point in the current frame with respect to the current point, where the third-type neighborhood point is a $Z^{th}$ circle point that encircles the current point and that is in the current frame; obtain a fourth-type smoothing weight of the point corresponding to the location of the current point in the $N^{th}$ frame before the current frame; and obtain the first-type smoothing weight according to the fourth-type smoothing weight and the third-type smoothing weight.

Optionally, the processing unit 42 is specifically configured to: obtain a third-type smoothing weight of a third-type neighborhood point of the current point in the current frame with respect to the current point, where the third-type neighborhood point is a $Z^{th}$ circle point that encircles the current point and that is in the current frame; obtain a fifth-type smoothing weight of the point corresponding to the location of the current point in the $M^{th}$ frame after the current frame; and obtain the second-type smoothing weight according to the fifth-type smoothing weight and the third-type smoothing weight.

Further, the processing unit 42 is further configured to obtain a third-type smoothing weight of a third-type neighborhood point of the current point in the current frame with respect to the current point, where the third-type neighborhood point is a $Z^{th}$ circle point that encircles the current point and that is in the current frame; and the processing unit 42 is specifically configured to perform smoothing calculation on the current point according to the first-type smoothing weight, the second-type smoothing weight, and the third-type smoothing weight.

In the foregoing solution, when smoothing calculation is performed on the point in the current frame, the smoothing weight of the point in the $N^{th}$ frame before the current frame, the smoothing weight of the point in the $M^{th}$ frame after the current frame, and a smoothing weight of the point in the current frame are referenced at the same time, that is, during smoothing calculation, a spatial correlation of the current frame is considered at the same time of considering the time correlation of the video frame; therefore, the texture or edge flare phenomenon of the video caused by considering only the point in the single frame during smoothing calculation can be avoided.

Optionally, the processing unit 42 is specifically configured to: obtain smoothing contributions of the first-type neighborhood point and the second-type neighborhood point to the current point according to a formula:

$$\sigma(k) * W(k) * W'(0) * [Y'(k) - Y'(0)], \sigma(k) =$$

$$\begin{cases} 1, & \text{if } |Y'(k) - Y'(0)| < \text{MeanGrad\_TH}' \\ 0, & \text{if } |Y'(k) - Y'(0)| \geq \text{MeanGrad\_TH}' \end{cases};$$

and perform smoothing calculation on the current point according to the smoothing contributions of the first-type neighborhood point and the second-type neighborhood point to the current point, where:

W(k)*W'(0)

is the smoothing weight of the first-type neighborhood point in a $k^{th}$ circle, W(k) is the smoothing weight of the third-type neighborhood point in the $k^{th}$ circle of the current point with respect to the current point, the third-type neighborhood point is the $Z^{th}$ circle point that encircles the current point and that is in the current frame, W'(0) is a smoothing weight of the point corresponding to the location of the current point in the $N^{th}$ frame before the current frame, Y'(k) is a gray value or a brightness value of the first-type neighborhood point in the $k^{th}$ circle, Y'(0) is a gray value or a brightness value of the point corresponding to the location of the current point in the $N^{th}$ frame before the current frame, and MeanGrad_TH' is an average gradient value of a target area in the $N^{th}$ frame before the current frame; or W(k)*W'(0)

is the smoothing weight of the second-type neighborhood point in a $k^{th}$ circle, W(k) is the smoothing weight of the third-type neighborhood point in the $k^{th}$ circle of the current point with respect to the current point, the third-type neighborhood point is the $Z^{th}$ circle point that encircles the current point and that is in the current frame, W'(0) is a smoothing weight of the point corresponding to the location of the current point in the $M^{th}$ frame after the current frame, Y'(k) is a gray value or a brightness value of the second-type neighborhood point in the $k^{th}$ circle, Y'(0) is a gray value or a brightness value of the point corresponding to the location of the current point in the $M^{th}$ frame after the current frame, and MeanGrad_TH' is an average gradient value of a target area in the $M^{th}$ frame after the current frame.

Optionally, the processing unit 42 is specifically configured to: obtain smoothing contributions of the first-type neighborhood point and the second-type neighborhood point to the current point according to a formula:

$$\sigma(k) * W(k) * W'(0) * [Y'(k) - Y'(0)], \sigma(k) = \begin{cases} 1, \text{ if } |Y'(k) - Y'(0)| < \text{MeanGrad\_TH}' \\ 0, \text{ if } |Y'(k) - Y'(0)| \geq \text{MeanGrad\_TH}' \end{cases}$$

where

W(k)*W'(0)

is the smoothing weight of the first-type neighborhood point in a $k^{th}$ circle, W(k) is the smoothing weight of the third-type neighborhood point in the $k^{th}$ circle of the current point with respect to the current point, W'(0) is a smoothing weight of the point corresponding to the location of the current point in the $N^{th}$ frame before the current frame, Y'(k) is a gray value or a brightness value of the first-type neighborhood point in the $k^{th}$ circle, Y'(0) is a gray value or a brightness value of the point corresponding to the location of the current point in the $N^{th}$ frame before the current frame, and MeanGrad_TH' is an average gradient value of a target area in the $N^{th}$ frame before the current frame; or W(k)*W'(0) is the smoothing weight of the second-type neighborhood point in a $k^{th}$ circle, W(k) is the smoothing weight of the third-type neighborhood point in the $k^{th}$ circle of the current point with respect to the current point, W'(0) is a smoothing weight of the point corresponding to the location of the current point in the $M^{th}$ frame after the current frame, Y'(k) is a gray value or a brightness value of the second-type neighborhood point in the $k^{th}$ circle, Y'(0) is a gray value or a brightness value of the point corresponding to the location of the current point in the $M^{th}$ frame after the current frame, and MeanGrad_TH' is an average gradient value of a target area in the $M^{th}$ frame after the current frame; obtain a smoothing contribution of the third-type neighborhood point to the current point according to a formula:

$$\sigma(k) * W(k) * [Y(k) - Y(0)], \sigma(k) = \begin{cases} 1, \text{ if } |Y(k) - Y(0)| < \text{MeanGrad\_TH} \\ 0, \text{ if } |Y(k) - Y(0)| \geq \text{MeanGrad\_TH} \end{cases}$$

where W(k) is the smoothing weight of the third-type neighborhood point in the $k^{th}$ circle, Y(k) is a gray value or a brightness value of the third-type neighborhood point in the $k^{th}$ circle, Y(0) is a gray value or a brightness value of the current point, and MeanGrad_TH is an average gradient value of the target area in the current frame; and perform smoothing calculation on the current point according to the smoothing contributions of the first-type neighborhood point, the second-type neighborhood point, and the third-type neighborhood point to the current point.

Optionally, each smoothing weight is a reciprocal of an exponential power of 2. Because each smoothing weight is the reciprocal of the exponential power of 2, a multiplication and division operation in smoothing calculation may be converted into a shift operation, improving a smoothing calculation speed.

It should be noted that the obtaining unit 41 and the processing unit 42 in this embodiment may be independently disposed processors, or may be implemented by being integrated into a processor of the video smoothing apparatus, and in addition, may be stored in a memory of the video smoothing apparatus in a program code form. The processor of the video smoothing apparatus invokes and executes functions of the obtaining unit 41 and the processing unit 42. The processor described herein may be a central processing unit (CPU for short), or an application-specific integrated circuit (ASIC for short), or one or more integrated circuits configured to implement this embodiment of the present invention.

Figure 5:
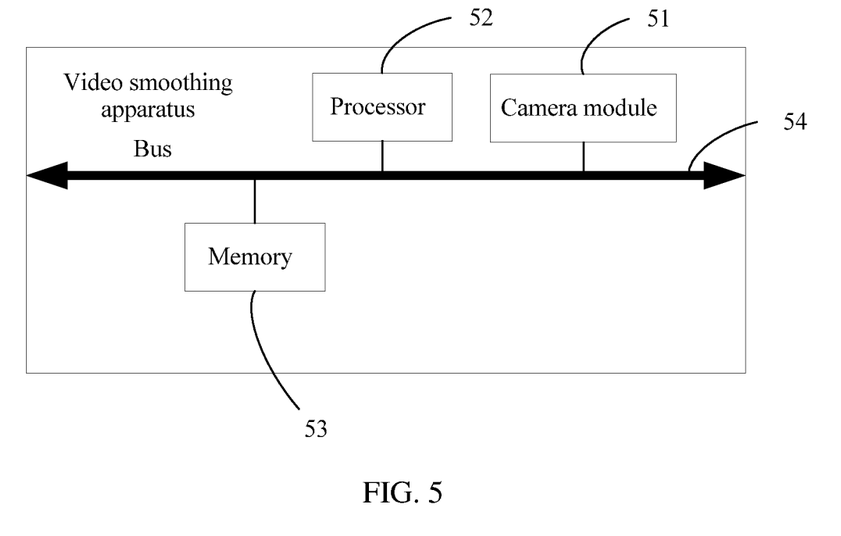
FIG. 5 is a schematic structural diagram of a video smoothing apparatus according to another embodiment of the present invention.

As shown in FIG. 5, an embodiment of the present invention provides a video smoothing apparatus, including a camera module 51, a processor 52, a memory 53, and a bus 54. The camera module 51, the processor 52, and the memory 53 are connected and complete mutual communication by using the bus 54.

It should be noted that the camera module 51 may be a sensor having an image collection function. For example, the camera module 51 may be a CCD (Charge Coupled Device), a CMOS (Complementary Metal-Oxide Semiconductor), or the like.

The processor 52 may be a processor, or may be a collective term of multiple processing elements. For example, the processor may be a central processing unit CPU, or may be an application-specific integrated circuit ASIC, or one or more integrated circuits configured to implement this embodiment of the present invention, for example, one or more microprocessors (digital signal processor, DSP for short) or one or more field programmable gate arrays (FPGA for short).

The memory 53 may be one storage apparatus or may be a collective term of multiple storage elements, and is configured to store executable program code or a parameter, data, and the like that are required for running an access network management device. In addition, the memory 53 may include a random access memory (RAM for short), and may further include a non-volatile memory (NVRAM for short), for example, a disk memory or a flash.

The bus 54 may be an industry standard architecture (ISA for short) bus, a peripheral component interconnect (PCI for short) bus, an extended industry standard architecture (EISA for short) bus, or the like. The bus 54 may be categorized into an address bus, a data bus, a control bus, and the like.

For ease of denotation, the bus 54 is represented by using only one thick line in FIG. 5. However, it does not mean that there is only one bus or only one type of bus.

The camera module 51 is configured to collect a video frame and store the video frame by using the memory 53. The processor 52 is configured to process program code in the memory 54, and execute functions of the obtaining unit 41 and the processing unit 42 of the video smoothing apparatus in the foregoing apparatus embodiment. For details, refer to the foregoing apparatus embodiment, and details are not described herein again.

In addition, a computer readable medium is further provided, and includes a computer readable instruction for performing the following operation when the instruction is being executed: performing operations of 101 to 105 and 201 to 207 in the method in the foregoing embodiment.

In addition, a computer program product is further provided, including the foregoing computer readable medium.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present embodiments essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a universal serial bus (USB) flash drive, a removable hard disk, a read-only memory (ROM for short), a random access memory (RAM for short), a magnetic disk, or an optical disc.

The foregoing descriptions are merely specific implementations of the present embodiments, but are not intended to limit the protection scope of the present embodiments. Any variation or replacement readily figured out by a person skilled in the art within the technical scope disclosed in the present embodiments shall fall within the protection scope of the present embodiments. Therefore, the protection scope of the present embodiments shall be subject to the protection scope of the claims.

What is claimed is:

1. A method comprising:
    obtaining, by an apparatus, a current point in a target area in a current frame;
    obtaining, by the apparatus, a first-type smoothing weight of a first-type plurality of neighborhood points in an $N^{th}$ frame before the current frame with respect to the current point, wherein the first-type plurality of neighborhood points is an $X^{th}$ circle of points that encircle a point corresponding to a location of the current point;
    obtaining, by the apparatus, a second-type smoothing weight of a second-type plurality of neighborhood points in an $M^{th}$ frame after the current frame with respect to the current point, wherein the second-type plurality of neighborhood points is a $Y^{th}$ circle of points that encircle the point corresponding to the location of the current point; and
    performing, by the apparatus, a smoothing calculation on the current point according to the first-type smoothing weight and according to the second-type smoothing weight, wherein M, N, X, and Y are positive integers.

2. The method according to claim 1, wherein obtaining the first-type smoothing weight of the first-type plurality of neighborhood points comprises:
    obtaining a third-type smoothing weight of a third-type plurality of neighborhood points of the current point in the current frame with respect to the current point, wherein the third-type plurality of neighborhood points is a $Z^{th}$ circle of points that encircle the current point, and wherein Z is a positive integer;
    obtaining a fourth-type smoothing weight of the point corresponding to the location of the current point in the $N^{th}$ frame before the current frame; and
    obtaining the first-type smoothing weight according to the fourth-type smoothing weight and according to the third-type smoothing weight.

3. The method according to claim 1, wherein obtaining the second-type smoothing weight of the second-type plurality of neighborhood points comprises:

obtaining a third-type smoothing weight of a third-type plurality of neighborhood points of the current point in the current frame with respect to the current point, wherein the third-type plurality of neighborhood points is a $Z^{th}$ circle of points that encircle the current point, and wherein Z is a positive integer;

obtaining a fifth-type smoothing weight of the point corresponding to the location of the current point in the $M^{th}$ frame after the current frame; and obtaining the second-type smoothing weight according to the fifth-type smoothing weight and according to the third-type smoothing weight.

4. The method according to claim 1, wherein the method further comprises:

obtaining a third-type smoothing weight of a third-type plurality of neighborhood points of the current point in the current frame with respect to the current point, wherein the third-type plurality of neighborhood points is a $Z^{th}$ circle of points that encircle the current point, after obtaining the current point; and wherein performing the smoothing calculation on the current point comprises performing the smoothing calculation on the current point according to the first-type smoothing weight, according to the second-type smoothing weight, and according to the third-type smoothing weight.

5. The method according to claim 4, wherein performing the smoothing calculation on the current point comprises:

obtaining a smoothing contribution of the first-type plurality of neighborhood points and obtaining a smoothing contribution of the second-type plurality of neighborhood points to the current point according to a formula:

$$\sigma(k) * W(k) * W'(0) * [Y'(k) - Y'(0)], \sigma(k) = \begin{cases} 1, \text{ if } |Y'(k) - Y'(0)| < \text{MeanGrad\_TH'} \\ 0, \text{ if } |Y'(k) - Y'(0)| \geq \text{MeanGrad\_TH'} \end{cases};$$

and performing the smoothing calculation on the current point according to the smoothing contribution of the first-type plurality of neighborhood points and according to the smoothing contribution of the second-type plurality of neighborhood points to the current point; and wherein $W(k)*W'(0)$ is the first-type smoothing weight of the first-type plurality of neighborhood points in a $k^{th}$ circle, $W(k)$ is the third-type smoothing weight of the third-type plurality of neighborhood points in the $k^{th}$ circle of the current point with respect to the current point, wherein the third-type plurality of neighborhood points is the $Z^{th}$ circle of points that encircles the current point, wherein $W'(0)$ is a smoothing weight of the point corresponding to the location of the current point in the $N^{th}$ frame before the current frame, wherein $Y'(k)$ is a gray value or a brightness value of the first-type plurality of neighborhood points in the $k^{th}$ circle, wherein $Y'(0)$ is a gray value or a brightness value of the point corresponding to the location of the current point in the $N^{th}$ frame before the current frame, and wherein MeanGrad_TH' is an average gradient value of a target area in the $N^{th}$ frame before the current frame.

6. The method according to claim 4, wherein performing the smoothing calculation on the current point comprises:

obtaining a smoothing contribution of the first-type plurality of neighborhood points and obtain a smoothing contribution of the second-type plurality of neighborhood points to the current point according to a formula:

$$\sigma(k) * W(k) * W'(0) * [Y'(k) - Y'(0)], \sigma(k) = \begin{cases} 1, \text{ if } |Y'(k) - Y'(0)| < \text{MeanGrad\_TH'} \\ 0, \text{ if } |Y'(k) - Y'(0)| \geq \text{MeanGrad\_TH'} \end{cases};$$

and performing the smoothing calculation on the current point according to the smoothing contribution of the first-type plurality of neighborhood points and according to the smoothing contribution of the second-type plurality of neighborhood points to the current point; and wherein $W(k)*W'(0)$ is the second-type smoothing weight of the second-type plurality of neighborhood points in a $k^{th}$ circle, wherein $W(k)$ is the third-type smoothing weight of the third-type plurality of neighborhood points in the $k^{th}$ circle of the current point with respect to the current point, wherein the third-type plurality of neighborhood points is a $Z^{th}$ circle of points that encircle the current point, wherein $W'(0)$ is a smoothing weight of the point corresponding to the location of the current point in the $M^{th}$ frame after the current frame, wherein $Y'(k)$ is a gray value or a brightness value of the second-type plurality of neighborhood points in the $k^{th}$ circle, wherein $Y'(0)$ is a gray value or a brightness value of the point corresponding to the location of the current point in the $M^{th}$ frame after the current frame, and wherein MeanGrad_TH' is an average gradient value of a target area in the $M^{th}$ frame after the current frame.

7. The method according to claim 4, wherein performing the smoothing calculation on the current point comprises:

obtaining smoothing contributions of the first-type plurality of neighborhood points and of the second-type plurality of neighborhood points to the current point according to a formula:

$$\sigma(k) * W(k) * W'(0) * [Y'(k) - Y'(0)], \sigma(k) = \begin{cases} 1, \text{ if } |Y'(k) - Y'(0)| < \text{MeanGrad\_TH'} \\ 0, \text{ if } |Y'(k) - Y'(0)| \geq \text{MeanGrad\_TH'} \end{cases},$$

wherein $W(k)*W'(0)$ is the first-type smoothing weight of the first-type plurality of neighborhood points in a $k^{th}$ circle, wherein $W(k)$ is the third-type smoothing weight of the third-type plurality of neighborhood points in the $k^{th}$ circle of the current point with respect to the current point, wherein $W'(0)$ is a smoothing weight of the point corresponding to the location of the current point in the $N^{th}$ frame before the current frame, wherein $Y'(k)$ is a gray value or a brightness value of the first-type plurality of neighborhood points in the $k^{th}$ circle, wherein $Y'(0)$ is a gray value or a brightness value of the point corresponding to the location of the current point in the $N^{th}$ frame before the current frame, and wherein MeanGrad_TH' is an average gradient value of a target area in the $N^{th}$ frame before the current frame;

obtaining a smoothing contribution of the third-type plurality of neighborhood points to the current point according to a formula:

$$\sigma(k) * W(k) * [Y(k) - Y(0)], \sigma(k) = \begin{cases} 1, & \text{if } |Y(k) - Y(0)| < \text{MeanGrad\_TH} \\ 0, & \text{if } |Y(k) - Y(0)| \geq \text{MeanGrad\_TH} \end{cases},$$

wherein W(k) is the third-type smoothing weight of the third-type plurality of neighborhood points in the $k^{th}$ circle, wherein Y(k) is a gray value or a brightness value of the third-type plurality of neighborhood points in the $k^{th}$ circle, wherein Y(0) is a gray value or a brightness value of the current point, and wherein MeanGrad_TH is an average gradient value of the target area in the current frame; and performing the smoothing calculation on the current point according to the smoothing contributions of the first-type plurality of neighborhood points, according to the second-type plurality of neighborhood points, and according to the third-type plurality of neighborhood points to the current point.

8. The method according to claim 4, wherein performing the smoothing calculation on the current point comprises:

obtaining smoothing contributions of the first-type plurality of neighborhood points and of the second-type plurality of neighborhood points to the current point according to a formula:

$$\sigma(k) * W(k) * W'(0) * [Y'(k) - Y'(0)], \sigma(k) = \begin{cases} 1, & \text{if } |Y'(k) - Y'(0)| < \text{MeanGrad\_TH}' \\ 0, & \text{if } |Y'(k) - Y'(0)| \geq \text{MeanGrad\_TH}' \end{cases},$$

wherein W(k)*W'(0) is the second-type smoothing weight of the second-type plurality of neighborhood points in a $k^{th}$ circle, wherein W(k) is the third-type smoothing weight of the third-type plurality of neighborhood points in the $k^{th}$ circle of the current point with respect to the current point, wherein W'(0) is a smoothing weight of the point corresponding to the location of the current point in the $M^{th}$ frame after the current frame, wherein Y'(k) is a gray value or a brightness value of the second-type plurality of neighborhood points in the $k^{th}$ circle, wherein Y'(0) is a gray value or a brightness value of the point corresponding to the location of the current point in the $M^{th}$ frame after the current frame, and wherein MeanGrad_TH' is an average gradient value of a target area in the $M^{th}$ frame after the current frame;

obtaining a smoothing contribution of the third-type plurality of neighborhood points to the current point according to a formula:

$$\sigma(k) * W(k) * [Y(k) - Y(0)], \sigma(k) = \begin{cases} 1, & \text{if } |Y(k) - Y(0)| < \text{MeanGrad\_TH} \\ 0, & \text{if } |Y(k) - Y(0)| \geq \text{MeanGrad\_TH} \end{cases},$$

wherein W(k) is the third-type smoothing weight of the third-type plurality of neighborhood points in the $k^{th}$ circle, wherein Y(k) is a gray value or a brightness value of the third-type plurality of neighborhood points in the $k^{th}$ circle, wherein Y(0) is a gray value or a brightness value of the current point, and wherein MeanGrad_TH is an average gradient value of the target area in the current frame; and performing the smoothing calculation on the current point according to the smoothing contributions of the first-type plurality of neighborhood points, according to the second-type plurality of neighborhood points, and according to the third-type plurality of neighborhood points to the current point.

9. The method according to claim 1, wherein the first-type smoothing weight of the first-type plurality of neighborhood points is a reciprocal of an exponential power of 2, and wherein the second-type smoothing weight of the second-type plurality of neighborhood points is a reciprocal of an exponential power of 2.

10. An apparatus, comprising:

a camera coupled to a non-transitory computer readable storage medium by a bus, wherein the camera is configured to collect a current frame and store the current frame in the non-transitory computer readable storage medium;

a processor coupled to the camera by a bus; and the non-transitory computer readable storage medium, wherein the non-transitory computer readable storage medium stores a program for execution by the processor, the program including instructions to:

obtain a current point in a target area in the current frame;

obtain a first-type smoothing weight of a first-type neighborhood point in an $N^{th}$ frame before the current frame with respect to the current point, wherein the first-type neighborhood point is an $X^{th}$ circle point that encircles a point corresponding to a location of the current point;

obtain a second-type smoothing weight of a second-type neighborhood point in an $M^{th}$ frame after the current frame with respect to the current point, wherein the second-type neighborhood point is a $Y^{th}$ circle point that encircles the point corresponding to the location of the current point;

obtain a smoothing contribution of the first-type neighborhood point, wherein the smoothing contribution of the first-type neighborhood point is obtained based on a comparison of:

a difference between a grey value or a brightness value of the first-type neighborhood point and a gray value or a brightness value of the current point in the current frame; and an average gradient value of the target area in the $N^{th}$ frame before the current frame; and perform a smoothing calculation on the current point according to the first-type smoothing weight, the smoothing contribution of the first-type neighborhood point, and according to the second-type smoothing weight, wherein M, N, X, and Y are positive integers.

11. The apparatus according to claim 10, wherein the instructions further comprise instructions to:

obtain a third-type smoothing weight of a third-type neighborhood point of the current point in the current frame with respect to the current point, wherein the third-type neighborhood point is a $Z^{th}$ circle point that encircles the current point;

obtain a fourth-type smoothing weight of the point corresponding to the location of the current point in the $N^{th}$ frame before the current frame; and obtain the first-type smoothing weight according to the fourth-type smoothing weight and according to the third-type smoothing weight.

12. The apparatus according to claim 10, wherein the instructions further comprise instructions to:

obtain a third-type smoothing weight of a third-type neighborhood point of the current point in the current frame with respect to the current point, wherein the third-type neighborhood point is a $Z^{th}$ circle point that encircles the current point;

obtain a fifth-type smoothing weight of the point corresponding to the location of the current point in the $M^{th}$ frame after the current frame; and obtain the second-type smoothing weight according to the fifth-type smoothing weight and according to the third-type smoothing weight.

13. The apparatus according to claim 10, wherein the instructions further comprise instructions to:

obtain a third-type smoothing weight of a third-type neighborhood point of the current point in the current frame with respect to the current point, wherein the third-type neighborhood point is a $Z^{th}$ circle point that encircles the current point; and perform the smoothing calculation on the current point according to the first-type smoothing weight, the second-type smoothing weight, and the third-type smoothing weight.

14. The apparatus according to claim 13, wherein the instructions further comprise instructions to:

obtain a smoothing contribution of the second-type neighborhood point to the current point, wherein the smoothing contribution of the first-type neighborhood point and the smoothing contribution of the second-type neighborhood point are determined according to a formula:

$$\sigma(k) * W(k) * W'(0) * [Y'(k) - Y'(0)], \sigma(k) = \begin{cases} 1, & \text{if } |Y'(k) - Y'(0)| < \text{MeanGrad\_TH}' \\ 0, & \text{if } |Y'(k) - Y'(0)| \geq \text{MeanGrad\_TH}' \end{cases};$$

and wherein the smoothing calculation on the current point is further performed according to the smoothing contribution of the second-type neighborhood point to the current point; and wherein W(k)*W'(0) is the first-type smoothing weight of the first-type neighborhood point in a $k^{th}$ circle, wherein W(k) is the third-type smoothing weight of the third-type neighborhood point in the $k^{th}$ circle of the current point with respect to the current point, wherein the third-type neighborhood point is the $Z^{th}$ circle point that encircles the current point, wherein W'(0) is a smoothing weight of the point corresponding to the location of the current point in the $N^{th}$ frame before the current frame, wherein Y'(k) is the gray value or the brightness value of the first-type neighborhood point in the $k^{th}$ circle, wherein Y'(0) is the gray value or the brightness value of the point corresponding to the location of the current d Gra point in the $N^{th}$ frame before the current frame, and wherein MeanGrad_TH' is the average gradient value of a target area in the $N^{th}$ frame before the current frame.

15. The apparatus according to claim 13, wherein the instructions further comprise instructions to:

obtain a smoothing contribution of the second-type neighborhood point to the current point, wherein the smoothing contribution of the first-type neighborhood point and smoothing contribution of the second-type neighborhood point are determined according to a formula:

$$\sigma(k) * W(k) * W'(0) * [Y'(k) - Y'(0)], \sigma(k) = \begin{cases} 1, & \text{if } |Y'(k) - Y'(0)| < \text{MeanGrad\_TH}' \\ 0, & \text{if } |Y'(k) - Y'(0)| \geq \text{MeanGrad\_TH}' \end{cases};$$

and wherein the smoothing calculation on the current point is further performed according to the smoothing contribution of the second-type neighborhood point to the current point; and wherein W(k)*W'(0) is the second-type smoothing weight of the second-type neighborhood point in a $k^{th}$ circle, wherein W(k) is the third-type smoothing weight of the third-type neighborhood point in the $k^{th}$ circle of the current point with respect to the current point, wherein the third-type neighborhood point is the $Z^{th}$ circle point that encircles the current point, wherein W'(0) is a smoothing weight of the point corresponding to the location of the current point in the $M^{th}$ frame after the current frame, wherein Y (k) is a gray value or a brightness value of the second-type neighborhood point in the $k^{th}$ circle, wherein Y'(0) is the gray value or the brightness value of the point corresponding to the location of the current point in the $M^{th}$ frame after the current frame, and wherein MeanGrad_TH' is the average gradient value of a target area in the $M^{th}$ frame after the current frame.

16. The apparatus according to claim 13, wherein the instructions further comprise instructions to:

obtain smoothing contributions of the second-type neighborhood point to the current point, wherein the smoothing contribution of the first-type neighborhood point and smoothing contribution of the second-type neighborhood point are determined according to a formula:

$$\sigma(k) * W(k) * W'(0) * [Y'(k) - Y'(0)], \sigma(k) = \begin{cases} 1, & \text{if } |Y'(k) - Y'(0)| < \text{MeanGrad\_TH}' \\ 0, & \text{if } |Y'(k) - Y'(0)| \geq \text{MeanGrad\_TH}' \end{cases},$$

wherein W(k)*W'(0) is the first-type smoothing weight of the first-type neighborhood point in a $k^{th}$ circle, wherein W(k) is the third-type smoothing weight of the third-type neighborhood point in the $k^{th}$ circle of the current point with respect to the current point, wherein W'(0) is a smoothing weight of the point corresponding to the location of the current point in the $N^{th}$ frame before the current frame, wherein Y'(k) is the gray value or the brightness value of the first-type neighborhood point in the $k^{th}$ circle, wherein Y'(0) is the gray value or the brightness value of the point corresponding to the location of the current point in the $N^{th}$ frame before the current frame, and wherein MeanGrad_TH' is the average gradient value of a target area in the $N^{th}$ frame before the current frame;

obtain a smoothing contribution of the third-type neighborhood point to the current point according to a formula:

$$\sigma(k) * W(k) * [Y(k) - Y(0)], \sigma(k) = \begin{cases} 1, & \text{if } |Y(k) - Y(0)| < \text{MeanGrad\_TH} \\ 0, & \text{if } |Y(k) - Y(0)| \geq \text{MeanGrad\_TH} \end{cases},$$

wherein

W(k) is the smoothing weight of the third-type neighborhood point in the $k^{th}$ circle, wherein Y(k) is a gray value or a brightness value of the third-type neighborhood point in the $k^{th}$ circle, wherein Y(0) is the gray value or the brightness value of the current point, and wherein MeanGrad_TH is the average gradient value of the target area in the current frame; and wherein the smoothing calculation on the current point is further performed according to the second-type neighborhood point and according to the third-type neighborhood point to the current point.

17. The apparatus according to claim 13, wherein the instructions further comprise instructions to:

obtain smoothing contributions of the second-type neighborhood point to the current point, wherein the smoothing contribution of the first-type neighborhood point and smoothing contribution of the second-type neighborhood point are determined according to a formula:

$$\sigma(k) * W(k) * W'(0) * [Y'(k) - Y'(0)], \sigma(k) = \begin{cases} 1, & \text{if } |Y'(k) - Y'(0)| < \text{MeanGrad\_TH}' \\ 0, & \text{if } |Y'(k) - Y'(0)| \geq \text{MeanGrad\_TH}' \end{cases}$$

wherein W(k)*W'(0) is the second-type smoothing weight of the second-type neighborhood point in a $k^{th}$ circle, wherein W(k) is the third-type smoothing weight of the third-type neighborhood point in the $k^{th}$ circle of the current point with respect to the current point, wherein W'(0) is a smoothing weight of the point corresponding to the location of the current point in the $M^{th}$ frame after the current frame, wherein Y'(k) is a gray value or a brightness value of the second-type neighborhood point in the $k^{th}$ circle, wherein Y'(0) is the gray value or the brightness value of the point corresponding to the location of the current point in the $M^{th}$ frame after the current frame, and wherein MeanGrad_TH' is the average gradient value of a target area in the $M^{th}$ frame after the current frame;

obtain a smoothing contribution of the third-type neighborhood point to the current point according to a formula:

$$\sigma(k) * W(k) * [Y(k) - Y(0)], \sigma(k) = \begin{cases} 1, & \text{if } |Y(k) - Y(0)| < \text{MeanGrad\_TH} \\ 0, & \text{if } |Y(k) - Y(0)| \geq \text{MeanGrad\_TH} \end{cases}$$

wherein

W(k) is the smoothing weight of the third-type neighborhood point in the $k^{th}$ circle, wherein Y(k) is a gray value or a brightness value of the third-type neighborhood point in the $k^{th}$ circle, wherein Y(0) is the gray value or the brightness value of the current point, and wherein MeanGrad_TH is the average gradient value of the target area in the current frame; and wherein the smoothing calculation on the current point is further performed according to the second-type neighborhood point and according to the third-type neighborhood point to the current point.

18. The apparatus according to claim 10, wherein the first-type smoothing weight of the first-type neighborhood point is a reciprocal of an exponential power of 2, and wherein the second-type smoothing weight of the second-type neighborhood point is a reciprocal of an exponential power of 2.

19. A non-transitory computer readable storage medium storing a program for execution by a processor, the program including instructions for:

obtaining a current point in a target area in a current frame;

obtaining a first-type smoothing weight of a first-type neighborhood point in an $N^{th}$ frame before the current frame with respect to the current point, wherein the first-type neighborhood point is an $X^{th}$ circle point that encircles a point corresponding to a location of the current point;

obtaining a second-type smoothing weight of a second-type neighborhood point in an $M^{th}$ frame after the current frame with respect to the current point, wherein the second-type neighborhood point is a $Y^{th}$ circle point that encircles the point corresponding to the location of the current point; and performing smoothing calculation on the current point according to the first-type smoothing weight and according to the second-type smoothing weight, wherein M, N, X, and Y are positive integers;

wherein the first-type smoothing weight or the second-type smoothing weight is based on an exponential decay based on M, N, X, or Y.

20. The non-transitory computer readable storage medium according to claim 19, wherein:

the first-type smoothing weight or the second-type smoothing weight exponential decay is a reciprocal of an exponential power of 2.

* * * * *

UNITED STATES PATENT AND TRADEMARK OFFICE
CERTIFICATE OF CORRECTION

PATENT NO. : 10,559,106 B2
APPLICATION NO. : 15/557849
DATED : February 11, 2020
INVENTOR(S) : Kongqiao Wang et al.

It is certified that error appears in the above-identified patent and that said Letters Patent is hereby corrected as shown below:

In the Claims

In Column 24, Line 45, Claim 10, delete "according to".

In Column 25, Line 56, Claim 14, delete "d Gra".

In Column 26, Line 22, Claim 15, delete "Y (k)" and insert --Y' (k)--.

Signed and Sealed this
Eighteenth Day of August, 2020

Andrei Iancu
*Director of the United States Patent and Trademark Office*